United States Patent
Srinivasan et al.

(10) Patent No.: US 7,146,542 B2
(45) Date of Patent: Dec. 5, 2006

(54) METHOD AND APPARATUS FOR DIAGNOSIS AND REPAIR OF COMPUTER DEVICES AND DEVICE DRIVERS

(75) Inventors: Karamadai Srinivasan, Rocklin, CA (US); Rajpal Gill, Rocklin, CA (US); Thomas M. Tripp, El Dorado Hills, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 631 days.

(21) Appl. No.: 10/325,046

(22) Filed: Dec. 20, 2002

(65) Prior Publication Data

US 2004/0123188 A1 Jun. 24, 2004

(51) Int. Cl.
*G06F 11/00* (2006.01)
(52) U.S. Cl. .................... 714/44; 719/327
(58) Field of Classification Search ............. 714/44, 714/5, 40; 717/168; 719/327
See application file for complete search history.

(56) References Cited

U.S. PATENT DOCUMENTS

| | | | |
|---|---|---|---|
| 5,557,740 A * | 9/1996 | Johnson et al. | 714/38 |
| 6,243,833 B1 * | 6/2001 | Hitchcock et al. | 714/33 |
| 6,538,996 B1 * | 3/2003 | West et al. | 370/238 |
| 6,539,499 B1 * | 3/2003 | Stedman et al. | 714/40 |
| 6,598,179 B1 * | 7/2003 | Chirashnya et al. | 714/37 |
| 6,950,964 B1 * | 9/2005 | McMichael et al. | 714/38 |
| 2002/0059310 A1 * | 5/2002 | Choi | 707/200 |
| 2002/0067504 A1 * | 6/2002 | Salgado et al. | 358/1.15 |
| 2002/0152430 A1 * | 10/2002 | Akasaka et al. | 714/43 |
| 2003/0037288 A1 * | 2/2003 | Harper et al. | 714/37 |
| 2004/0098714 A1 * | 5/2004 | Metz | 717/168 |

* cited by examiner

*Primary Examiner*—Robert W Beausoliel
*Assistant Examiner*—Christopher McCarthy

(57) ABSTRACT

A method and apparatus for diagnosing and repairing hardware and software problems relating to computer peripheral devices and their software drivers. The method and apparatus enumerate the devices, identify devices having errors, detect replacement software drivers and then un-install possibly defective software drivers so that they may be replaced automatically by the operating system, run hardware tests and attempt repairs on hardware devices.

13 Claims, 6 Drawing Sheets

METHOD AND APPARATUS FOR DIAGNOSIS AND REPAIR OF COMPUTER DEVICES AND DEVICE DRIVERS

COPYRIGHT STATEMENT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to devices connected to a computer internally or externally by a network, port, or other means of communication and interfaced to the computer by means of driver software. In particular, the present invention relates to diagnosing and repairing devices and device drivers.

2. Description of the Related Art

When the personal computer was first introduced in the late 1970s and early-to-mid 1980s, peripheral devices such as printers, modems, scanners, hard drives, and other such accessories had to be custom designed to work with a specific type of PC. A printer, for example, required a hardware interface that connected with one of the proprietary ports of a given PC or that connected with a bus card that complied with the proprietary bus design of a given PC.

To enable programs to communicate with such devices, each device manufacturer needed to provide special device driver software. This special software established an interface between one or more particular software programs running on a given PC, such as a particular word processor, and that manufacturer's device, such as a particular printer. Preferably, this special device driver software established an interface to the operating system of the PC and communicated through the operating system with the particular software programs, so that only one device driver was needed for each device connected to a given PC. But in these early years, this could not always be arranged because of speed and other limitations of the early PC operating systems. Thus, separate device drivers were frequently required for each separate software program on each different PC.

Each device was connected to a particular type of port, such as a Centronics parallel port (PC) or RS-232 serial port (PC) or RS-422 serial port (Mac "serial port" and "local talk network"), or to a particular bus, such as the PC's ISA bus or the Apple's NuBus. Device driver for each device communicated with that device by communicating with the port or the bus to which that device was connected.

By the early 1990s, the situation had improved somewhat with the introduction of fairly standardized hardware and software interfaces for such devices. These include the standardized Ethernet connector and its associated software, which can network to many peripheral devices; the standardized universal serial bus port (USB port) and its associated software, which also supports the addressing of many different devices; and the modern PC parallel port, which now supports several high-speed protocols for bi-directional communications between a PC and devices complying with IEEE Standard 1284. These interfaces have now displaced almost entirely the earlier proprietary ports, busses, and protocols on both Apple Macintosh and IBM PC compatible computers worldwide. In addition, modern operating systems on both Apple and IBM PC computers have standardized the interfaces between individual programs and all device drivers to such an extent that device drivers, while still having to be customized to the needs of particular devices, can now have a standard interface with the operating system. Unfortunately, operating systems, even those from the same vendor, still come in several different and incompatible varieties each of which requires a customized device driver. Thus, a given manufacturer of, say, a particular type of printer may need to provide USB, parallel port, and Ethernet device drivers not only for the Macintosh and the PC compatibles but also for various operating system versions on each of these platforms.

Further advances have occurred in the abilities of operating systems to enumerate the specific identities of the various devices that may be connected to a computer at any given time. For example, through a protocol known as "Plug-and-Play," all of the modern Microsoft Windows operating systems, starting with version 95, are now able to interrogate their various buses and ports to determine what devices are connected to a computer. Devices have also been designed to respond to such enumeration requests by not only identifying themselves, but also by identifying in some manner the driver software which they require, such that operating systems may then prompt the user to find and to present the appropriate driver software for installation as part of the operating system to support the operation of each such device.

All of this standardization has promoted keen competition among device product designers. They may equip their devices with one of a very small number of hardware interfaces, and then they need merely supply driver software appropriate to the device and matching the specifics of the operating system installed on a given PC. All of this has made it fairly simple to connect a new device, to install its driver, and to have them both operating. In most cases, a new device and its driver may be installed while a computer is operating, although the computer may need to be restarted to complete the driver installation.

Even given all of these advances, the vendors of devices still find that their users have a difficult time keeping the devices fully operative, and accordingly numerous telephone support requests are received from customers whose devices are not operating properly. Of these calls, only about 10 percent result from hardware-specific problems arising because of mechanical or electrical malfunctions of a device. The remainder of the calls relate to various software problems—about ninety percent of all calls received.

In many cases, the user's problem may be identified by performing simple tests to see if a device and its driver software are both installed, running, and communicating with the computer's operating system. Some problems may be solved by providing the user with a newer version of a driver or by reinstalling the existing driver. While skilled computer technicians can resolve these types of problems with little or no assistance, many computer owners, users, and operators lack the technical expertise to figure out how to detect and solve such problems on their own.

The software problems normally fall into one of the following scenarios:

The device was never installed properly.

The device is not able to communicate with the computer.

The device is using an incorrect driver. Typically, the customer has installed the device but has installed an incorrect driver, one not suited for the particular device.

The computer is using an older, outdated version of the driver. The driver vendor may have a newer version of the driver, but the customer doesn't know about this and is not benefiting from fixes and enhancements to the software.

The customer is using an incorrect driver for the operating system installed on the computer. This typically occurs when a customer upgrades to a different operating system and only then discovers that the drivers installed on the computer no longer work with the newly installed operating system.

The computer is using a device driver having a chosen human language that differs from that of the operating system and of the user. For example, an English language driver may be installed with an operating system that is set to work in Spanish for a Spanish speaking user.

The device driver did not successfully install completely. For example, some of its dependent files are not installed upon the computer or are otherwise damaged or incorrect.

Other device problems are possible. Some may be correctable by the user, but others may require the attention of a skilled technician.

A number of automated services are known that can assist one in detecting and correcting some of these problems. Among others, Microsoft's "Windows Update" service is now able to detect the drivers associated with the Windows 2000 and XP operating systems, check an external database of driver updates, and present the user with a list of suggested updated versions of driver software for installation on a computer. But other than proposing upgrades for drivers, this service does not otherwise assist in diagnosing hardware and software problems originating in devices, their drivers, or their connections, and in exploring and presenting possible solutions.

Hewlett-Packard has a service named "HP INSTANT SUPPORT" (service mark) which includes and uses software designed by Motive Communications, Inc. Briefly described, when a user requests support (from the "HP INSTANT SUPPORT" website), the user's computer downloads and receives a user support program named "TUNER" (a trademark of Motive Communications, Inc.). This TUNER program maintains an updated set of web pages (and the like) on the user's computer and assists the user with various self-service tasks as well as with seeking assistance.

Another way for a user to gain assistance is to contact a support center through the Internet, either by filling out an on-line form or by sending an e-mail to the support center. In either case, the user describes the problem they are having along with identifying the product they are using and waits for a response from the support center, which could either take the form of an automated response based on various criteria in the support request or a custom response created by a support specialist. However, unless the user has included specific information about the device and the health of the device's drivers in their request, none of this information is available to help the support center trouble-shoot effectively or suggest solutions based on driver information. The user is unlikely to include specific device and driver information in the request because the user is unlikely to know that it is relevant, where to find the information, and how to collect all of the relevant information. A further problem is that hardware diagnostic tools used in the industry do not have the ability to separate driver problems from hardware problems. Accordingly, there is a need for a device repairer that integrates the ability to solve both software problems and hardware problems.

SUMMARY OF THE INVENTION

A method and apparatus for diagnosing and repairing devices connected to a computer and interfaced to the computer by each device's driver software. The method and apparatus comprise enumerating the devices connected to the computer; detecting whether any device has an error; selecting the type of repair to perform on a device from a software repair directed to the device's driver or a hardware repair of the device itself or its connections; and attempting to perform the selected repair.

DETAILED DESCRIPTION OF THE DRAWINGS

Figure 1:
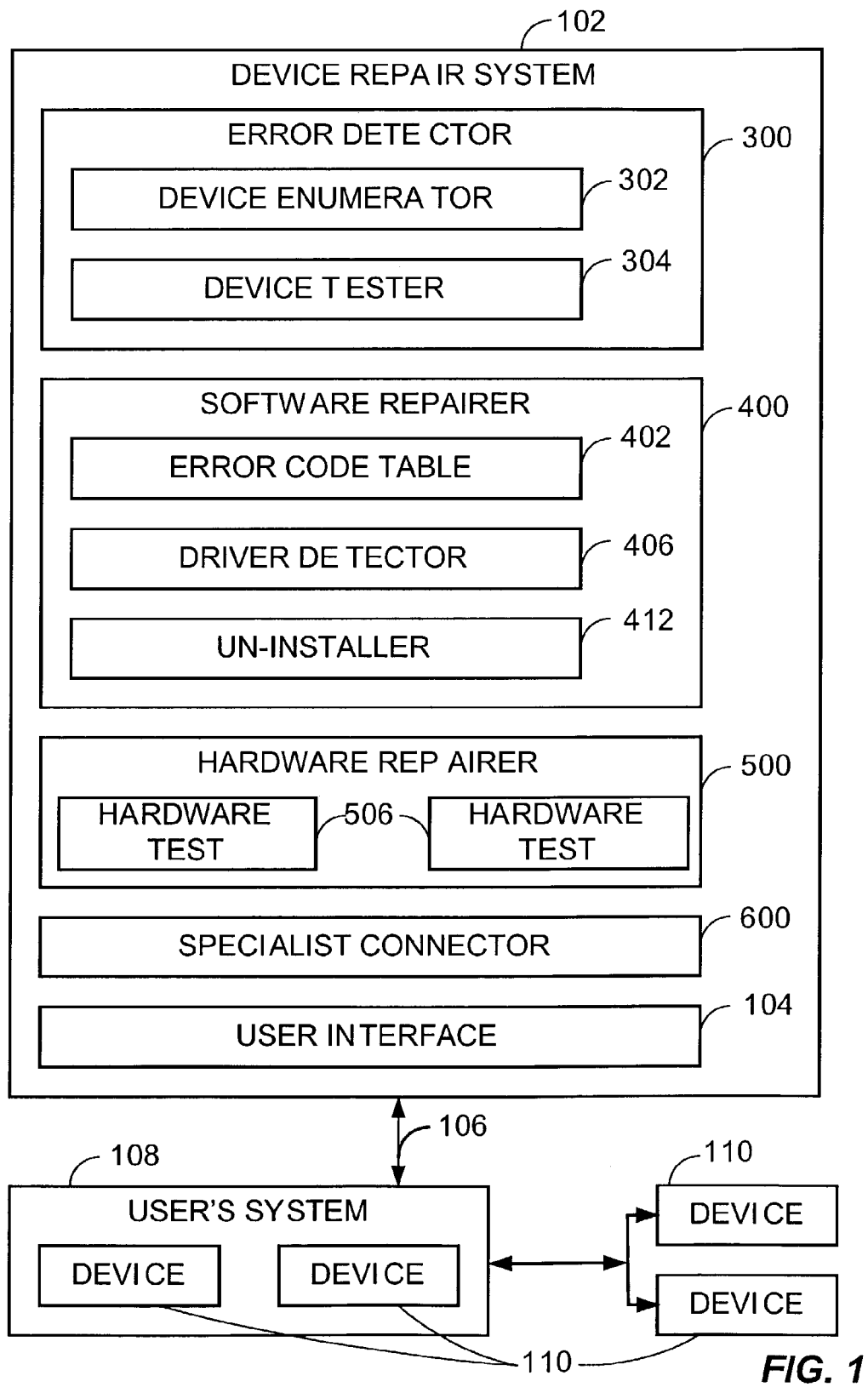
FIG. 1 presents an overview block diagram of an embodiment of the present invention.

An embodiment of the present invention is designed to be implemented as part of a Web based type of support service (such as "HP INSTANT SUPPORT," for example) that is provided by a service provider which may be a peripheral vendor, a computer vendor, or an operating system vendor to it's customer. Such a service can also be offered by a third party. The service acts as a remote support center for customers in need of computer support.

Unlike prior art based on isolated software tests, hardware tests, and remote specialist support, an embodiment of the present invention allows the user to receive an integrated service combining all three approaches to solving the user's problems with their devices. Additionally, unlike prior art, the diagnosis and repair of the user's devices can be done without the user having detailed technical knowledge.

A user sitting at a computer and desiring support services begins by turning on the computer's web browser and then communicating over the Internet with the web site of the remote support center. The user then requests support.

In response to this selection, the host computer of the remote support center (not shown) may download a computer program that can, in response to a user request for assistance, gather data defining the status of the computer and forward that data to a central location along with the request of the user for assistance. For example, the host computer may cause a copy of the TUNER program of Motive Communications, Inc., to be downloaded and installed on the user's computer, with the TUNER program being attached to an icon placed on the desktop of the computer and visible to the user. Also downloaded is at least a first set of content material, including at least a displayable web page listing various types of support services that may be available to the user.

To use the support service, the user clicks on the desktop icon and then views whatever support options are available. To place this embodiment of the present invention into operation, the user clicks on a menu entry that might read, for example, "Device Diagnostics and Repair."

When the user clicks on this menu entry, the browser downloads additional pages containing additional instructions. These pages are automatically updated when necessary by the TUNER program. These pages are kept stored and available on the user's computer to save time by making it unnecessary to download them in the future, and the TUNER program checks for new versions and automatically downloads them when they are available.

The present invention can also be implemented without the TUNER program. In another embodiment, it is implemented as a downloadable C++ program that is supported by HTML web pages and by a browser plug-in. Desirably, as is done with the TUNER program, this second embodiment retains copies of HTML/Java pages on the client computer to improve performance, but checks for updated pages with a central server and downloads them to keep the client computer up-to-date.

Yet another embodiment can be delivered to a client computer without the use of a web-based support service. It can be delivered pre-installed on a new computer, or it can be delivered on a CD, or it can be simply downloaded by a user wishing to gain the benefits of the invention.

Now referring to FIG. 1, a possible configuration of the various elements of the present embodiment is shown and is called a device repair system 102.

A user's system 108 includes plural devices 110 that are either part of the internal system of the user's computer (memory, hard disk drive, etc.) or connected externally to the user's system (printer, mouse, keyboard, etc.). The user's system 108 communicates with the device repair system 102 via a connection 106. The device repair system 102 can be a maintained as part of a web site, or it may be pre-installed on the user's system 108, or located on a CD-ROM, or downloaded onto the user's system 108 from a Web site, or it may be accessed in some other way that allows the user's system 108 to communicate with the device repair system 102.

The device repair system 102 contains an error detector 300, a software repairer 400, a hardware repairer 500, a specialist connector 600, and a user interface 104 which may utilize, or be part of, the general user interface of the user's system 108 (not shown). The user interface 104 allows the user (not shown) to interact with the device repair system 102. The user interface 104 allows the user to select which tests are to be performed on which devices, and it displays the results of tests to the user.

The error detector 300 may further include a device enumerator 302 which allows the error detector 300 to find and to identify the devices 110 connected to the user's system 108 by use of the operating system's registry, a user created list, or by some other means. The error detector 300 may also include a device tester 304. The device tester 304 tests each device 110 found by the device enumerator 302 and can generate an error code or device status (or both) for each device.

The software repairer 400 may include an error code table 402, a driver detector 406, and an un-installer 412. In one embodiment, this error code table 402 is updated with any changes that the operating system manufacturer makes to the definition of the operating system's error codes by means of an automatic Web delivered update to the table 402. The error code table 402 may include for each error an error code number, an error type reference, a description of the problem, a suggested solution, and an action to perform. Possible entries in a typical error code table 402 (for the error codes "1" and "3") might include the following:

Error Code: 1
  Type Reference: GENERIC
  Problem Description: This device is not configured correctly
  Solution: The system has not had a chance to configure the device. To resolve the problem, follow the instructions in the Device Status box. In addition, you may be able to resolve this issue by removing the device using the Device Manager, and then running the Add New Hardware wizard from Control Panel.
  Action: OPEN_DEV_MANAGER |REMOVE_DEVICE_REBOOT
Error Code: 3
  Type Reference: GENERIC
  Problem Description: The driver for this device may be bad, or your system may be running low on memory or other resources.
  Solution: User the Device Manager to remove the device and then run the Add New Hardware tool in Control Panel.
  Action: OPEN_DEV_MANAGER | REMOVE_DEVICE_REBOOT The software repairer 400 attempts to implement the solution given in the error code table 402. For many of the errors in the error code table 402, the solution calls for the un-installing of the device driver and the installation of a new device driver. The driver detector 406 determines if a new driver required for a device 110 is available, either on the hard drive (for Windows, in a CABS subdirectory, such as "C:\Windows\Options\Cabs" in Windows 97, for example, or in an equivalent place under some other operating system) or on a CD-ROM or floppy disk that the user has at hand (such as that supplied with an operating system). The un-installer 412 is a program that can remove the current software driver installed for the device 110 that is reporting an error. Optionally, the un-installer can also install any available new driver, or this can be done automatically by an operating system such as Windows in response to the removal of the current software driver when the computer next reboots.

The hardware repairer 500 contains hardware tests 506 that are specific to different types of devices 110. For example, hardware tests 506 for a hard drive may include a physical surface scan tests and a hard disk de-fragmenter. Tests can also be conducted to see, for example, if an external device is not properly plugged in or if its cabling is defective or if it is not powered up, or if an internal device is not properly plugged into its connector.

The specialist connector 600 allows the user to receive further help and assistance from a support specialist. The specialist connector 600 may allow support through an instant messaging system, a web phone, etc., or the specialist connector 600 may allow support through a delayed response system, such as an email system or a filled out and submitted form sent over the Web or Internet. The specialist connector 600 need not connect the user to a live support specialist, but that is also an option. The user can also interact with an artificial support specialist consisting of a computer that is programmed to send predetermined suggestions in response to particular requests for assistance.

Figure 2:
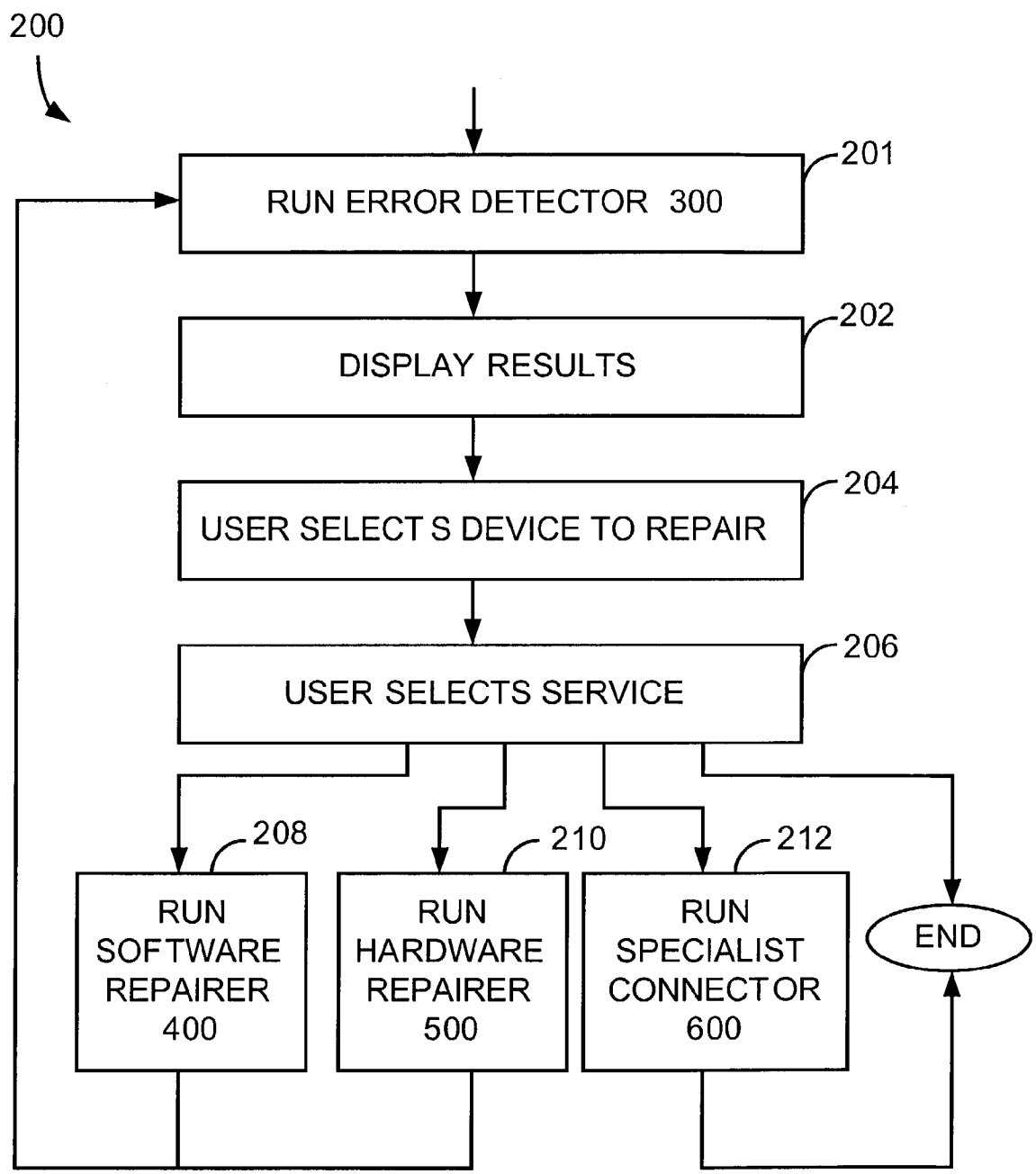
FIG. 2 presents a flow chart illustrating in overview the steps carried out by the embodiment of the invention shown in FIG. 1, and in particular the order in which the elements of the invention are called upon.

Now referring to FIG. 2, the overall operation of an embodiment of the present invention is shown. The program 200 starts and calls upon the error detector 300 at the step 201 to determine which devices are not working properly. In one embodiment, the error detector 300 creates an XML file that contains the results of the error detector 300's operation. The XML file may, for example, contain a device ID, a device description, an error code, and a status code of each device tested. Two sample entries (written here in text form, rather than XML form, for clarity) might look like this:

Device:
   Device ID: ACPI\DOCKDEVICE\_SB_.PCIO.ISAO.SPRO
   Device Description: Docking Station
   Error Code: 0
   Status: Device has been started Device:
   Device ID: ACPI\PNP0700\5& 1AA7FB68&0
   Device Description: Standard floppy disk controller
   Error Code: 22
   Status: Device is disabled At step 202, the program 200 displays the results of the error detector 300's operation to the user. The program 200 may display only the status of those devices 110 reporting errors, or alternatively it may display the status of all the devices 110 connected to the user's system 108. For the devices 110 whose status is displayed, all of the information in the XML file may be displayed; or alternatively, the information contained in the XML file may be displayed in a more selective and non-technical manner. For example, each device tested may be listed with a name or a picture or both, and those devices that are reporting errors may have their names or pictures or both highlighted or otherwise marked to show even a non-technical user that they are not working properly.

At step 204, the user is permitted to select which device 110 the user would like to repair. In one embodiment, the user selects the device 110 by highlighting a device 110 reporting an error in the list of devices 110 displayed during step 202. At step 206, the user selects which type of repair to attempt by choosing either to run a software repairer 400 at the step 208, to run a hardware repairer 500 at the step 210, or to run a specialist connector 600 at the step 212. Alternatively, the user can choose to "END" the program's operation. In one embodiment, the program 200 suggests that the user first use the software repairer 400, then the hardware repairer 500, and finally the specialist connector 600. This ordering of the tests has the advantage of directing the user to the tests that are most likely to solve the user's problem in the quickest way.

In another embodiment, one or more of steps 201, 202, 204, and 206 can be removed. If step 201 is removed, then the user is able to select which device 110 to repair without having to have all of the devices 110 tested, thus saving time. If steps 202 and 204 are removed, then the program 200 can automatically determine which device 110 to repair, and it can carry out those repairs automatically without necessitating human involvement. If step 206 is removed, then the program 200 can automatically determine the order in which the repairs are attempted, thereby permitting the computer to 'fix itself' with little or no human involvement. There are some applications where such automatic repairs of the devices 110 can be desirable.

In the present embodiment, following the completion of the step 206, the program 200 ends or branches to one of the three repair choices: running the software repairer 400 at the step 208, running the hardware repairer 500 at the step 210, and running the specialist connector 600 at the step 212. In one embodiment, after either the software repairer 400 or the hardware repairer 500 has completed its operations, the program 200 cycles back to the beginning of the program 200, to running the error detector 300 at the step 201, and begins anew.

This cyclic operation can be advantageous for two reasons: First, the chosen repair may not have worked. If the error detector 300 is still detecting an error for that device 110 after an attempted repair has been completed, then the user can attempt one of the other possible repairs for the same device 110, or the user may call upon the specialist connector 600. Secondly, if the user's system 108 is experiencing more than one device 110 reporting errors, then after one device 110 is repaired, the program 200 grants the user the option of trying to repair one of the other devices 110 that is reporting an error.

Figure 3:
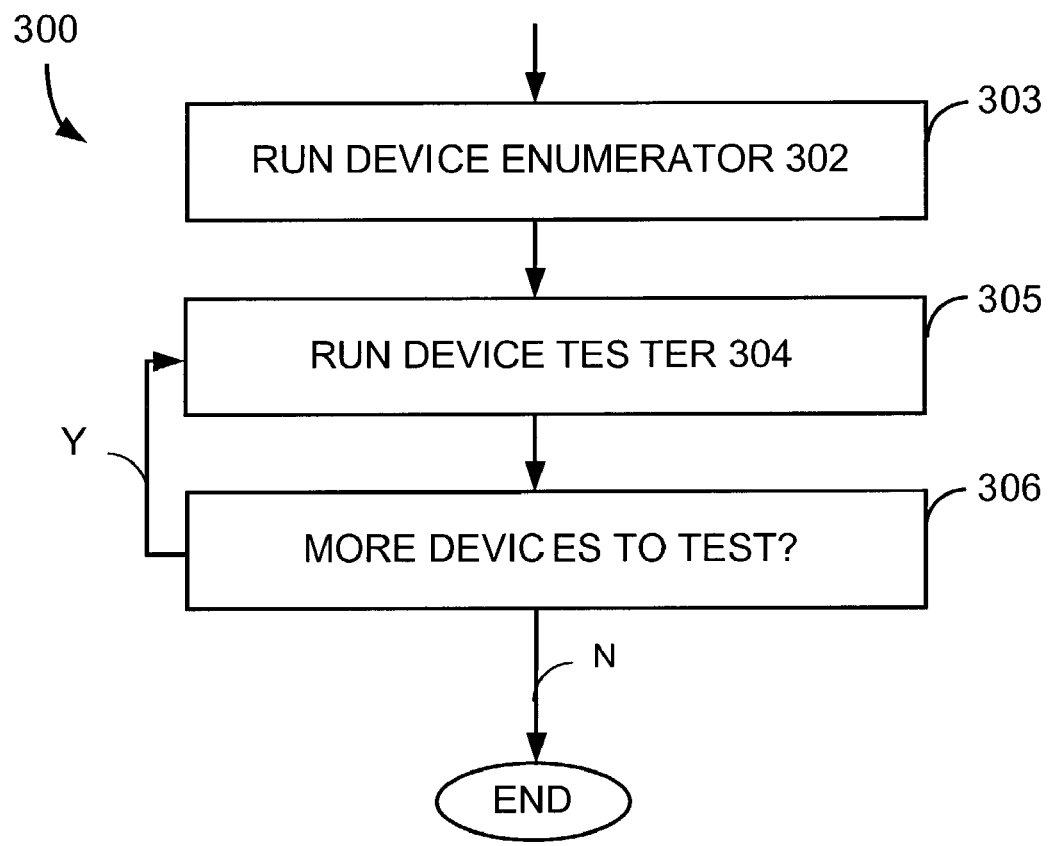
FIG. 3 presents a flow chart of the steps performed by the error detector 300 (shown in FIGS. 1 and 2).

With reference to FIG. 3, the error detector 300 calls upon the device enumerator 302 at the step 303 to find and identify all of the devices 110 connected to the user's system 108. The device enumerator 302 creates an XML file with a device ID and a device description for each of the devices 110. In one embodiment intended for use with Windows operating systems "Windows 95," "Windows 98," "Windows ME," "Windows XP," "Windows NT," and "Windows 2000" the device enumerator 300 obtains this information from the operating system's registry. Alternatively, another embodiment of the present invention allows the user to create the user's own list of devices 110 that the user wants the error detector 300 to test.

At step 305, the error detector 300 tests a device 110 to see if it is working properly using the device tester 304. In the above Windows embodiments, the detector 300 does this by querying the Windows operating system, and the operating system returns an error code and the status of the device 110. This information is added to the XML entry for the device 110. In another embodiment, step 305 can self-test each device without relying upon an operating system query.

At step 306, the error detector 300 determines if the devices 110 enumerated by the device enumerator 302 have all been tested. If there are more devices 110 that need testing, the error detector 300 branches back to step 305. If there are no more devices 110 to test, the error detector 300 terminates, and program control continues with element 202 in FIG. 2. Further details of the Window's embodiment of the error detector 300 are shown in Appendix A.

Figure 4:
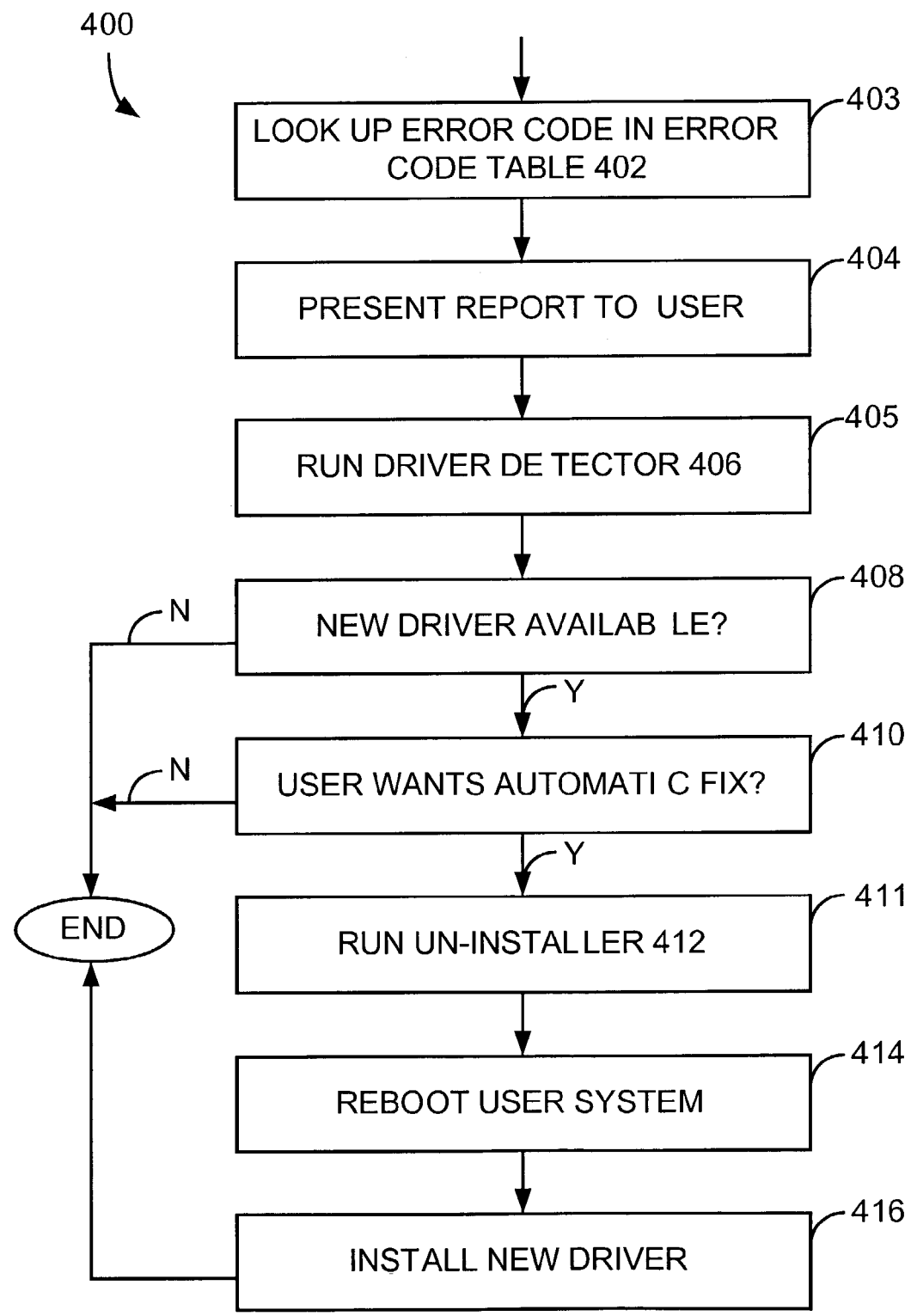
FIG. 4 is a flow chart of the steps performed by the software repairer 400 (shown in FIGS. 1 and 2).

Referring now to FIG. 4, the software repairer 400 begins at the step 403 by looking up any error codes in the error code table 402 (FIG. 1) to determine what the error codes mean (step 403 in FIG. 4). In one embodiment, the error code table 402 is prepared containing Window's error codes along with a description of each error, the cause of each error, and a suggested fix for the associated problem, as was explained above. The error code table 402 may be stored as an XML data file on the central web site. The software repairer 400, at step 404, presents a report (not shown) to the user. The report includes information taken from the error code table 402, as has been explained. In one embodiment, the software repairer 400 may terminate program execution at this point if the error code table 402 states that the problem is not a software problem.

Next, the driver detector 406 is called at the step 405. The driver detector 406 determines if a new driver for the device 110 is available. In the present embodiment, the driver detector 406 checks to see if the driver is in the Window's CABS directory.

If the driver is not in the CABS directory, the driver detector 406 asks the user if they have the driver at hand on either a CD-ROM, a floppy disk, or stored within some other location on their computer or on their local network. In another embodiment, the driver detector 406 can attempt to find the driver on a remote web-site and download it to the user's system 108.

At step 408, the software repairer 400 determines if the driver detector 406 has found an available and acceptable driver. If such a driver is not available, then the software repairer 400 routine terminates, and program control resumes in FIG. 2. If such a driver is available, then the software repairer 400 branches to step 410 where it asks the user if the user would like the software repairer 400 to attempt to fix the problem. In different embodiments, this question can be asked earlier or not all. If the user answers no, then the software repairer 400 terminates program execution, returning program control to FIG. 2. If the user answers yes, then the software repairer 400 branches to the step 411 and runs the un-installer 412.

The un-installer 412 deletes the driver for the device 110 reporting the error. Then, at step 414, the user's system 108 is rebooted. At step 416, following the rebooting, the Windows operating system automatically detects that there is a connected device without a driver. The operating system then proceeds automatically to install a new driver, and the operating system may require a further reboot of the computer before the newly-installed driver can take effect. Although listed in FIG. 4 as part of the software repairer 400, the step 416 in the Window's embodiment is not part of the software repairer 400 but is part of the plug and play technology embedded within the Windows operating system. In a different embodiment, the software repairer 400 itself would install the new driver at step 416. In such an embodiment, rebooting of the computer at step 414 may not be required, depending on the nature of the operating system software and how the new driver is installed. After the new driver is installed at step 416, the software repairer 400 terminates program execution, and the program 200 cycles back to the steps performed by the error detector 300, as is shown in FIG. 2.

Figure 5:
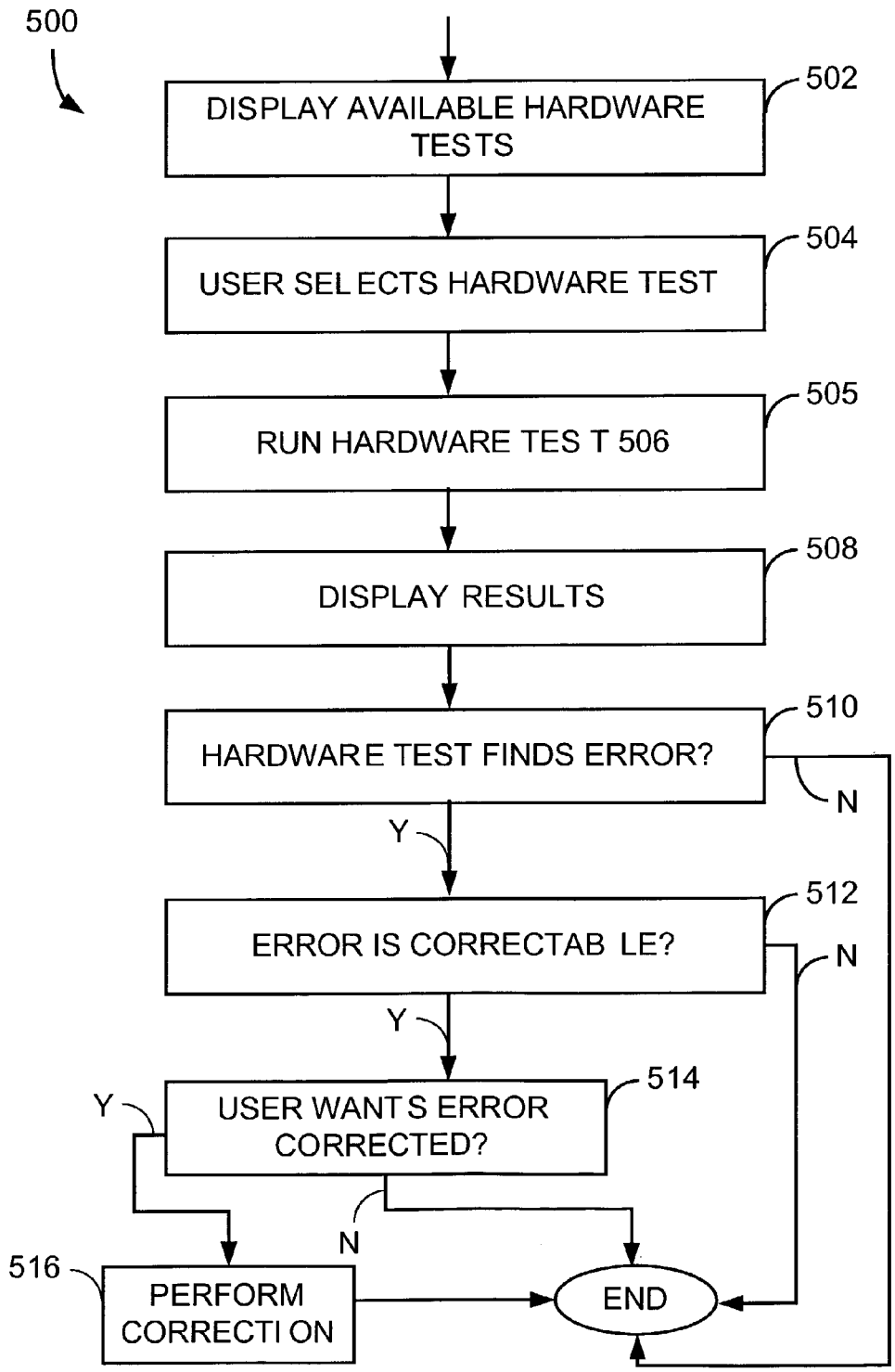
FIG. 5 is a flow chart of the steps performed by the hardware repairer 500 (shown in FIGS. 1 and 2).

With reference to FIG. 5, at the step 502 the hardware repairer 500 presents the user with the available hardware tests 506 for any chosen device 110 that the user wishes subjected to such tests. For example, if the device 110 reporting the error is a hard drive, then the user can be presented with the options of scanning the physical surface of the hard drive, de-fragmenting the hard drive, or performing other hardware tests 506. At step 504, the user selects which hardware test the user desires to have run. In another embodiment, the steps 502 and 504 can be bypassed, and the hardware repairer 500 can determine automatically which procedure to perform.

Next, the hardware repairer 500 runs the chosen hardware test 506 at the step 505. Certain hardware tests 506 may require further action by the user, such as input from a keyboard or mouse or insertion of a floppy disk or CD ROM. At step 508, the results of the hardware test 506 are displayed to the user. At step 510, the hardware repairer 500 determines if the hardware test 506 detected an error caused by the device 110. If no error is detected, the hardware repair process terminates. If an error is found, then the hardware repairer 500 branches to step 512 where it determines if the detected error is correctable. If so, then the user is informed; and the hardware repairer 500 branches to the step 516, performs the correction, and then terminates program execution, returning program control to FIG. 2. The program 200 then branches back and transfers program control to the error detector 300 to test again for additional device errors.

Figure 6:
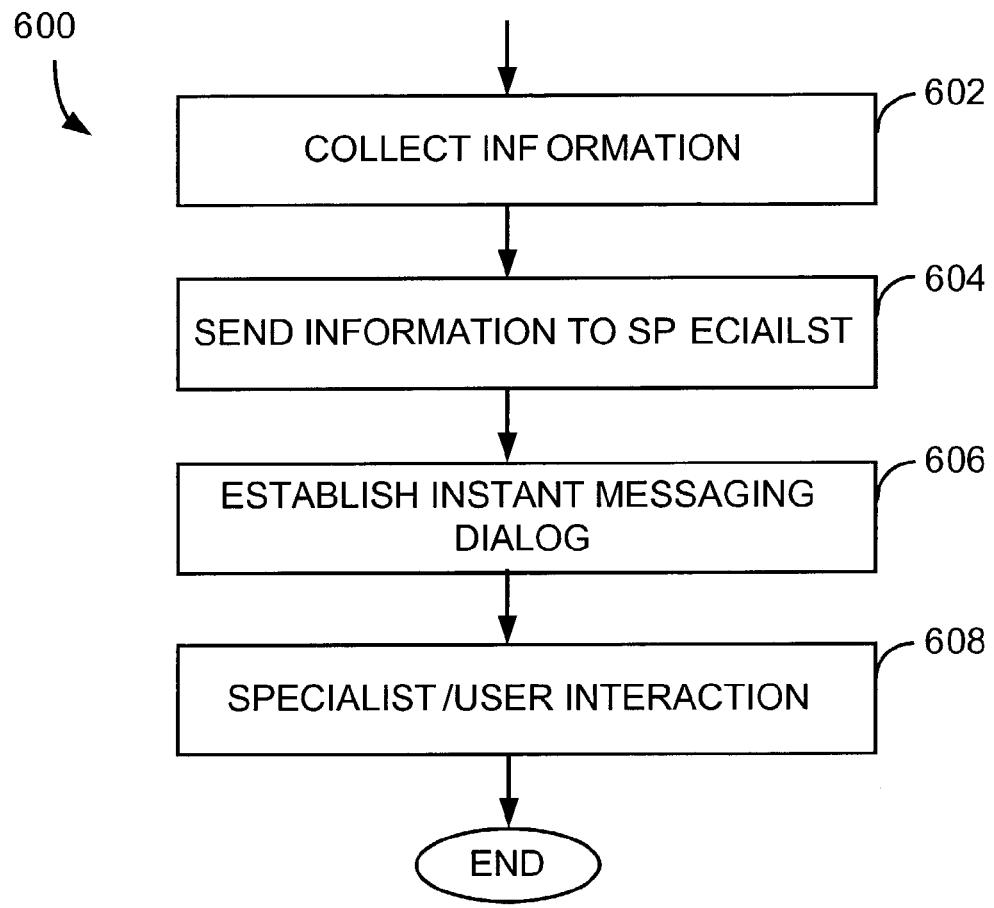
FIG. 6 is a flow chart of the steps performed by the specialist connector 600 (shown in FIGS. 1 and 2).

Now referring to FIG. 6, the specialist connector 600 is described in detail. At step 602, the specialist connector 600 collects information about the device 110 that is the source of an error report. Such information may include the information contained within the XML file that was created by the error detector 300, the information found within the error code table 402, the information gained from any hardware tests 506 performed, and any other additional information that a support specialist may need to effectively assist the user in diagnosing and repairing the problem. At step 604, this collected information is sent to the support specialist (not shown). At step 606, an instant messaging dialog session is established between the user and the support specialist. At step 608, the user and support specialist interact, with the support specialist asking any further necessary or helpful questions and proposing possible solutions that can be executed by the user or by the support specialist (by remote control of the user's system).

In another embodiment, the instant messaging dialog may be initiated without collecting and sending information as taught in steps 602 and 604 just described. In yet another embodiment, instead of establishing an instant messaging dialog with the user, the user and the support specialist may communicate by email, by web phone connection, by telephone, by means of a web page form filled out by the user, or by means of any other mechanism whereby information can be communicated between the user and the support specialist.

It is possible for many of the various elements of and steps carried out by the device repair system 102 to be combined into one or more scripts or computer programs. Different parts of device repair system 102, such as the error code table 402, can be contained within or associated with the software repairer 400 or made part of or be associated with some other system element, or made an independent program or script.

In brief summary, the invention provides a novel system for diagnosing and repairing computer devices and their software drivers. Several embodiments and other variations of the invention have been described and illustrated, but the invention is not limited to the specific forms and arrangements described and illustrated above. It will be apparent to those of ordinary skill in the art that the invention can be modified in its arrangement and details without departing from its true spirit and scope, as defined by the appended claims.

APPENDIX A

An Embodiment of the Error Detector 300 and Software Repairer 400 for Windows

```
#include "devcon.h"
#include <string.h>
FILE *stream;
char *outfile;
```

APPENDIX A-continued

An Embodiment of the Error Detector 300 and Software Repairer 400 for Windows

```
LPTSTR GetDeviceStringProperty(HDEVINFO Devs, PSP_DEVINFO_DATA
DevInfo,DWORD Prop)
{
  LPTSTR buffer;
  DWORD size;
  DWORD reqSize;
  DWORD dataType;
  DWORD szChars;
  size = 1024;
  buffer = new TCHAR[(size/sizeof(TCHAR))+1];
  if(!buffer)
      {
      return NULL;
      }
  while(!SetupDiGetDeviceRegistryProperty(Devs,DevInfo,Prop,&dataType,(LPBYTE)buffer,size,
&reqSize))
      {
      if(GetLastError( ) != ERROR_INSUFFICIENT_BUFFER) {
         goto failed;
      }
      if(dataType != REG_SZ) {
         goto failed;
      }
      size = reqSize;
      delete [] buffer;
      buffer = new TCHAR[(size/sizeof(TCHAR))+1];
      if(!buffer) {
         goto failed;
      }
      }
  szChars = reqSize/sizeof(TCHAR);
  buffer[szChars] = TEXT('\0');
  return buffer;
failed:
  if(buffer) {
     delete [] buffer;
  }
  return NULL;
}
LPTSTR GetDeviceDescription(HDEVINFO Devs,PSP_DEVINFO_DATA DevInfo)
{
  LPTSTR desc;
  desc = GetDeviceStringProperty(Devs,DevInfo,SPDRP_FRIENDLYNAME);
  if(!desc) {
     desc = GetDeviceStringProperty(Devs,DevInfo,SPDRP_DEVICEDESC);
  }
  return desc;
}
void replaceStr(char *Str,char *newDevId, char ch)
{
        char *word;
        word = strtok(Str,"&");
        strcpy(newDevId,word);
        while(word!=NULL)
        {
            word = strtok(NULL,"&");
            if(word==NULL) break;
            strcat(newDevId,"&");
            strcat(newDevId,word);
        }
    return;
}
BOOL DumpDeviceWithInfo(HDEVINFO Devs,PSP_DEVINFO_DATA DevInfo,LPCTSTR
Info)
{
  TCHAR devID[MAX_DEVICE_ID_LEN];
  BOOL b = TRUE;
  SP_DEVINFO_LIST_DETAIL_DATA devInfoListDetail;
  devInfoListDetail.cbSize = sizeof(devInfoListDetail);
        if(CM_Get_Device_ID(DevInfo-
>DevInst,devID,MAX_DEVICE_ID_LEN,0)!=CR_SUCCESS)
        {
      lstrcpy(devID,TEXT("?"));
      b = FALSE;
  }
        char newDevId[MAX_DEVICE_ID_LEN + 20];
```

APPENDIX A-continued

An Embodiment of the Error Detector 300 and Software Repairer 400 for Windows

```
            replaceStr(devID,newDevId,'&');
            printf("\n%s",newDevId);
            fprintf(stream,"\n\t\t<DeviceID>\"%s\"</DeviceID>",newDevId);
    return b;
}
BOOL DumpDeviceDescr(HDEVINFO Devs,PSP_DEVINFO_DATA DevInfo)
{
    LPTSTR desc;
    desc = GetDeviceDescription(Devs,DevInfo);
    if(!desc) {
            printf("\nDevice Description is not available for this device");
        return FALSE;
    }
            fprintf(stream,"\n\t\t<DeviceDescription>\"%s\"</DeviceDescription>",desc);
    printf("\n%s",desc);
    delete [] desc;
    return TRUE;
}
BOOL DumpDeviceStatus(HDEVINFO Devs,PSP_DEVINFO_DATA DevInfo)
{
    SP_DEVINFO_LIST_DETAIL_DATA devInfoListDetail;
    ULONG status = 0;
    ULONG problem = 0;
    BOOL hasInfo = FALSE;
        CMAPI CONFIGRET WINAPI CM_Get_DevNode_Status(OUT PULONG
pulStatus,OUT PULONG pulProblemNumber,IN DEVINST dnDevInst,IN ULONG ulFlags );
    devInfoListDetail.cbSize = sizeof(devInfoListDetail);
    if(CM_Get_DevNode_Status(&status,&problem,DevInfo->DevInst,0)!=CR_SUCCESS)
        {
        return FALSE;
    }
        printf("\nError Code : %i",problem);
        fprintf(stream,"\n\t\t<ErrorCode>%i</ErrorCode>",problem);
    if((status & DN_HAS_PROBLEM) && problem == CM_PROB_DISABLED)
        {
        hasInfo = TRUE;
        printf("\n%s","Device is disabled");
            fprintf(stream,"\n\t\t<Status>\"%s\"</Status>","Device is disabled");
        return TRUE;
    }
    if(status & DN_HAS_PROBLEM)
        {
        has Info = TRUE;
        printf("\n%s","Device has a problem");
            fprintf(stream,"\n\t\t<Status>\"%s\"</Status>","Device has a problem");
    }
    if(status & DN_PRIVATE_PROBLEM)
        {
        hasInfo = TRUE;
        printf("\n%s","Device has a problem reported by the driver");
            fprintf(stream,"\n\t\t<Status>\"%s\"</Status>","Device has a problem reported
by the driver");
    }
    if(status & DN_STARTED)
        {
        printf("\n%s","Device has been started");
            fprintf(stream ,"\n\t\t<Status>\"%s\"</Status>","Device has been started");
    }
        else if (!hasInfo)
        {
            fprintf(stream,"\n\t\t<Status>\"%s\"</Status>","Device is currently stopped");
        printf("\nDevice is currently stopped");
    }
    return TRUE;
}
int GetDeviceInfoAndDelete(char * devIDtoDelete)
{
        HDEVINFO devs = INVALID_HANDLE_VALUE;
    DWORD err;
    int failcode = EXIT_FAIL;
    DWORD devIndex;
    SP_DEVINFO_DATA devInfo;
    SP_DEVINFO_LIST_DETAIL_DATA devInfoListDetail;
    BOOL matchFound = FALSE;
    SP_REMOVEDEVICE_PARAMS rmdParams;
    LPCTSTR action = NULL;
```

APPENDIX A-continued

An Embodiment of the Error Detector 300 and Software Repairer 400 for Windows

```
    TCHAR devID[MAX_DEVICE_ID_LEN];
        devInfoListDetail.cbSize = sizeof(devInfoListDetail);
        printf("Device to be deleted is %s", devIDtoDelete);
    devs = SetupDiGetClassDevs(
NULL,NULL,NULL,DIGCF_ALLCLASSES|DIGCF_PRESENT);
        if(devs == INVALID_HANDLE_VALUE)
        {
            err = GetLastError( );
            printf( "SetupDiGetClassDevs failed: %lx.\n", err );
            failcode=EXIT_FAIL;
            goto final;
        }
        devInfoListDetail.RemoteMachineHandle = NULL;
        strcpy(devInfoListDetail.RemoteMachineName,"");
    devInfoListDetail.cbSize = sizeof(devInfoListDetail);
        devInfoListDetail.cbSize = sizeof(SP_DEVINFO_LIST_DETAIL_DATA);
    devInfo.cbSize = sizeof(devInfo);
    for(devIndex=0;SetupDiEnumDeviceInfo(devs,devIndex,&devInfo);devIndex++)
        {
            if(CM_Get_Device_ID(devInfo.DevInst,devID,MAX_DEVICE_ID_LEN,0)!=CR_SUCC
ESS)
            {
                lstrcpy(devID,TEXT("?"));
            }
            printf("Dev ID for comparison is : %s \n",devID);
            if(strcmp(devID,devIDtoDelete)==0)
            {
                printf("\n match found");
                matchFound = TRUE;
                rmdParams.ClassInstallHeader.cbSize =
sizeof(SP_CLASSINSTALL_HEADER);
                rmdParams.ClassInstallHeader.InstallFunction = DIF_REMOVE;
                rmdParams.Scope = DI_REMOVEDEVICE_GLOBAL;
                rmdParams.HwProfile = 0;
            if(!SetupDiSetClassInstallParams(devs,&devInfo,&rmdParams.ClassInstallHeader,siz
eof(rmdParams)) ||!SetupDiCallClassInstaller(DIF_REMOVE,devs,&devInfo))
                {
                    failcode = EXIT_FAIL;
                    goto final;
                }
                printf("\n\n Device has been deleted");
                break;
            }
        }
        // The device was deleted!!
        if(matchFound == FALSE)
        {
            printf("\n\n No matching device id found!!");
            failcode = EXIT_FAIL;
        }
        else
        {
            failcode = EXIT_OK;
        }
final:
    if(devs != INVALID_HANDLE_VALUE) {
            printf("destorying DevsInfoList");
        SetupDiDestroyDeviceInfoList(devs);
            printf("After destorying DevsInfoList");
    }
    return failcode;
}
int EnumerateDevice( )
{
    HDEVINFO devs = INVALID_HANDLE_VALUE;
    DWORD err;
    int failcode = EXIT_FAIL;
    DWORD devIndex;
    SP_DEVINFO_DATA devInfo;
    SP_DEVINFO_LIST_DETAIL_DATA devInfoListDetail;
    DWORD numClass = 0;
    int skip = 0;
        devs = SetupDiGetClassDevs(
NULL,NULL,NULL,DIGCF_ALLCLASSES|DIGCF_PRESENT);
        if(devs == INVALID_HANDLE_VALUE)
        {
```

APPENDIX A-continued

An Embodiment of the Error Detector 300 and Software Repairer 400 for Windows

```
            err = GetLastError( );
            printf( "SetupDiGetClassDevsEx failed: %lx.\n", err );
            failcode= EXIT_FAIL;
            goto final;
        }
        devInfoListDetail.RemoteMachineHandle = NULL;
        strcpy(devInfoListDetail.RemoteMachineName,"");
    devInfoListDetail.cbSize = sizeof(devInfoListDetail);
        devInfoListDetail.cbSize = sizeof(SP_DEVINFO_LIST_DETAIL_DATA);
    devInfo.cbSize = sizeof(devInfo);
    for(devIndex=0;SetupDiEnumDeviceInfo(devs,devIndex,&devInfo);devIndex++)
        {
            TCHAR devID[MAX_DEVICE_ID_LEN];
            if(CM_Get_Device_ID(devInfo.DevInst,devID,MAX_DEVICE_ID_LEN,0)!=CR_SUCC
ESS)
            {
                lstrcpy(devID,TEXT("?"));
            }
//          printf("Dev ID for comparison is : %s \n",devID);
            printf("\n\n");
            fprintf(stream,"\n\t<Device>");
            if(!DumpDeviceWithInfo(devs,&devInfo,NULL)) return EXIT_OK;
    DumpDeviceDescr(devs,&devInfo);
            DumpDeviceStatus(devs,&devInfo);
            fprintf(stream,"\n\t</Device>");
        }
    failcode = EXIT_OK;
final:
    if(devs != INVALID_HANDLE_VALUE) {
        SetupDiDestroyDeviceInfoList(devs);
    }
    return failcode;
}
int removeDevice(char *devID)
{
        printf("%s",devID);
        return GetDeviceInfoAndDelete(devID);
}
int listDeviceStatus( )
{
        int result;
        if(outfile!=NULL)
        {
            stream = fopen(outfile, "w" );
        }
        else
        {
            stream = fopen("devlist.xml", "w" );
        }
        fprintf(stream,"<DeviceManager>");
    result = EnumerateDevice( );
        fprintf(stream,"\n</DeviceManager>");
        fclose(stream );
        return result;
}
void writeReturnCode(int code)
{
        FILE *Ostream;
        Ostream = fopen( "DMStatus.out", "w" );
        fprintf(Ostream,"%i",code);
        fclose(Ostream);
}
void main(int argc,LPTSTR argv[])
{
        int retval;
        if(argc<2)
        {
            printf("Wrong arguments");
            writeReturnCode(3);
            exit(3);
        }
        if(strcmp(argv[1],"remove")==0)
        {
            //Check if the id is specified
            printf("calling remove device %s ", argv[2]);
            if(argv[2]==NULL)
```

APPENDIX A-continued

An Embodiment of the Error Detector 300 and Software Repairer 400 for Windows

```
        {
            printf("Missing device id");
            writeReturnCode(3);
            exit(3);
        }
        retval = removeDevice(argv[2]);
        writeReturnCode(retval);
        exit(retval);
    }
    if(strcmp(argv[1],"status")==0)
    {
        // if the out file name is specified
        if(argc==3)
        {
            outfile =argv[2];
        }
        printf("Calling status");
        retval = listDeviceStatus( );
        writeReturnCode(retval);
        exit(retval);
    }
    writeReturnCode(2);
    exit(2);
                            }
```

What is claimed is:

1. A method for diagnosing and repairing devices connected to a computer and interfaced to the computer by each device's driver software, comprising the steps of:

enumerating the devices connected to a user's system, and testing at least some of the enumerated devices for errors;

if errors are found, attempting to repair at least some of the devices for which an error has been found by running a software repair on the device's driver software, and then re-testing the devices subjected to the software repair; and if errors are still found, attempting to repair at least some of the devices for which an error has still been found by running a hardware repair on the devices wherein the hardware repair further comprises the steps of:

determining hardware tests available for the device;

peforming an available hardware test, and if the test indicates a repair procedure may be possible, initiating an attempt to repair the device by carrying out the indicated repair procedure;

marking the hardware test performed as unavailable; and if the device error has not been corrected and if other possible hardware repair procedures remain to be tried, then restarting the hardware repair.

2. The method of claim 1 wherein the running of a software repair further comprises the steps of: determining if a new driver is available; if a new driver is available, removing any existing driver for the device.

3. The method of claim 1 wherein the running of a software repair further comprises the steps of: determining if a new driver is available; if a new driver is available, replacing any existing driver with a new driver for the device.

4. The method of claim 1 to which is added the following step: after running the hardware repair, if one or more devices are still reporting errors, contacting a support specialist and providing the specialist with information concerning the devices and the errors.

5. An apparatus for diagnosing and repairing devices installed within or attached to a user's computer system and also driver software for such devices, comprising:

the user's computer system having an operating system;

at least one device connected to the user's computer system and interfaced to the operating system by device driver software to convey information between the device and the operating system;

a device repair system connected to the user's computer system, the device repair system comprising:

an error detector arranged to detect errors relating to the devices and their driver software, a software repairer arranged to repair device driver software, a hardware repairer arranged to repair the devices wherein the hardware repairer performs sub-steps of determining hardware tests available for the device; performing an available hardware test, and if the test indicates a repair procedure maybe possible, initiating an attempt to repair the device by carrying out the indicated repair procedure; marking the hardware test performed as unavailable; and if the device error has not been corrected and if other possible hardware repair procedures remain to be tried, then restarting the hardware repairer substeps based on the remaining available hardware tests, and a user interface enabling a use of the user's system to control and direct the error detection and repair process.

6. The apparatus of claim 5 wherein the error detector comprises: a device enumerator that identifies all devices connected to the user's computer system; and a device tester that determines whether any given device is working properly or improperly.

7. The apparatus of claim 5 wherein the software repairer comprises:

an error code table containing information about device-related error codes which is obtainable from the operating system;

a driver detector that determines whether new device driver software for a device is available; and an uninstaller that uninstalls the device driver software for a device associated with at least one error, thereby enabling the operating system to install a new driver for the device located by the driver detector.

8. The apparatus of claim 5 wherein the software repairer comprises:

an error code table containing information about device-related error codes which is obtainable from the operating system;

a driver detector that determines whether new device driver software for a device is available; and an uninstaller that uninstalls the device driver software for a device associated with at least one error and installs the new driver located by the driver detector for the device.

9. The apparatus of claim 5, further comprising: a specialist connector that transfers relevant information concerning drivers and driver software to a support specialist and also places the user in contact with the specialist for assistance.

10. A device and device driver software repairer, comprising:

enumerator means for identifying the devices connected to a computer system;

device tester means for identifying device errors by determining if devices are working properly;

software repairer means for correcting software device driver errors; and hardware repairer means for correcting hardware device errors wherein the hardware repairer means performs sub-steps of determining hardware tests available for the device;

performing an available hardware test, and if the test indicates a repair procedure may be possible, initiating an attempt to repair the device by carrying out the indicated repair procedure;

marking the hardware test performed as unavailable; and if the device error has not been corrected and if other possible hardware repair procedures remain to be tried, then restarting the hardware repairer means substeps based on the remaining available hardware tests, and a user interface enabling a use of the user's system to control and direct the error detection and repair process.

11. A repairer in accordance with claim 10, wherein the software repairer means further comprises: driver detector means for determining if a new driver for a device is available; and un-installer means for uninstalling a device's software driver.

12. A repairer in accordance with claim 10, wherein the software repairer means further comprises: driver detector means for determining if a new driver for a device is available; and un-installer means for uninstalling a device's software driver and replacing it with an available new driver.

13. A repairer in accordance with claim 10 which further comprises: specialist connector means for communicating with a support specialist.

* * * * *